United States Patent
Takahashi et al.

(10) Patent No.: US 11,791,934 B2
(45) Date of Patent: *Oct. 17, 2023

(54) COMMUNICATION DEVICE, COMMUNICATION METHOD, PROGRAM, AND COMMUNICATION SYSTEM (71) Applicant: Sony Group Corporation, Tokyo (JP)

(72) Inventors: Hiroo Takahashi, Kanagawa (JP); Takashi Yokokawa, Kanagawa (JP); Sonfun Lee, Kanagawa (JP); Naohiro Koshisaka, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 79 days.

This patent is subject to a terminal disclaimer.

(21) Appl. No.: 16/092,240

(22) PCT Filed: May 2, 2017

(86) PCT No.: PCT/JP2017/017221
§ 371 (c)(1),
(2) Date: Oct. 9, 2018

(87) PCT Pub. No.: WO2017/199761
PCT Pub. Date: Nov. 23, 2017

(65) Prior Publication Data
US 2019/0097757 A1    Mar. 28, 2019

(30) Foreign Application Priority Data
May 18, 2016   (JP) .................................. 2016-099955

(51) Int. Cl.
H04L 1/00      (2006.01)
G06F 13/42     (2006.01)
(Continued)

(52) U.S. Cl.
CPC .............. *H04L 1/0061* (2013.01); *G06F 1/10* (2013.01); *G06F 11/1004* (2013.01);
(Continued)

(58) Field of Classification Search
CPC ......... G06F 13/4291; G06F 2213/0016; G06F 11/1004; G06F 11/1032; G06F 13/20;
(Continued)

(56) References Cited

U.S. PATENT DOCUMENTS 10,892,852 B2 *  1/2021  Takahashi ........... G06F 13/4291
2003/0161354 A1 *  8/2003  Bader .................. H04L 1/0083
                                                              370/537
(Continued)

FOREIGN PATENT DOCUMENTS

EP     3459189       3/2019
JP     2000-099448 A   4/2000
(Continued)

OTHER PUBLICATIONS

E. T. Nana, "New Serial Bus for Sensor Interface in Mobile and Electronic Equipment," Public Use, NXP—FTF 2016 Technology Forum, pp. 1-28, May 18, 2016.
(Continued)

*Primary Examiner* — Cynthia Britt
*Assistant Examiner* — Sazzad Hossain
(74) *Attorney, Agent, or Firm* — Michael Best & Friedrich LLP (57) ABSTRACT Provided is a communication device, including: a transmission and reception unit that transmits and receives a signal with an other communication device; an error detection unit that detects an occurrence of an error by having the transmission and reception unit receive a preamble specifying a type of data to be transmitted next, and comparing a bit sequence of a signal received following the preamble to a bit
(Continued)

sequence that should be transmitted for the type specified for transmission by the preamble; and a conflict avoidance unit that, if the occurrence of an error is detected by the error detection unit, instructs the transmission and reception unit to transmit a clock corresponding to a certain number of bits following the preamble, and then transmit an abort signal giving an instruction to terminate communication partway through.

20 Claims, 8 Drawing Sheets (51) Int. Cl.
G06F 11/10 (2006.01)
G06F 1/10 (2006.01)
G06F 13/20 (2006.01)
H04L 7/04 (2006.01)
H04L 1/08 (2006.01)

(52) U.S. Cl.
CPC .......... *G06F 13/20* (2013.01); *G06F 13/4291* (2013.01); *H04L 1/0041* (2013.01); *G06F 11/1032* (2013.01); *G06F 13/4282* (2013.01); *G06F 2213/0016* (2013.01); *H04L 1/08* (2013.01); *H04L 7/041* (2013.01)

(58) Field of Classification Search
CPC ......... G06F 13/4282; G06F 1/10; H04L 1/08; H04L 29/12273; H04L 61/2053; H04L 1/0061; H04L 1/0041; H04L 7/041
See application file for complete search history.

(56) References Cited

U.S. PATENT DOCUMENTS

| | | | | |
|---|---|---|---|---|
| 2004/0036808 | A1* | 2/2004 | Lendaro | G06F 13/4291 348/725 |
| 2005/0172199 | A1* | 8/2005 | Miller | H04L 1/08 714/749 |
| 2005/0206542 | A1* | 9/2005 | Yanagisawa | H04L 1/0061 341/94 |
| 2008/0071879 | A1 | 3/2008 | Park | |
| 2008/0229169 | A1* | 9/2008 | Naritomi | G06F 11/1032 714/752 |
| 2011/0116331 | A1 | 5/2011 | Tsai et al. | |
| 2013/0138879 | A1* | 5/2013 | Kulkarni | G06F 13/42 711/114 |
| 2015/0100711 | A1 | 4/2015 | Sengoku | |
| 2015/0146552 | A1* | 5/2015 | Majmundar | H04W 24/08 370/252 |
| 2015/0248373 | A1 | 9/2015 | Sengoku | |
| 2016/0188429 | A1* | 6/2016 | Noguchi | G06F 12/16 714/6.21 |
| 2017/0033045 | A1* | 2/2017 | Betsui | G06F 1/3243 |
| 2017/0255588 | A1* | 9/2017 | Pitigoi-Aron | G06F 13/364 |
| 2017/0279542 | A1* | 9/2017 | Knauer | H04L 65/1059 |
| 2019/0123858 | A1* | 4/2019 | Takahashi | G06F 13/4291 |

FOREIGN PATENT DOCUMENTS

| | | |
|---|---|---|
| JP | 2002-175269 A | 6/2002 |
| JP | 2005-260500 A | 9/2005 |
| JP | 2016-541211 A | 12/2016 |
| JP | 2017-207934 A | 11/2017 |
| JP | 2017-208710 A | 11/2017 |
| JP | 2017-208712 A | 11/2017 |
| TW | 201546620 A | 12/2015 |
| WO | 2003063465 A2 | 7/2003 |
| WO | 2017/199759 A1 | 11/2017 |
| WO | 2017/199762 A1 | 11/2019 |

OTHER PUBLICATIONS

NXP Semiconductors—UM10204: "I2C-Bus specification and user manual," pp. 1-64, Apr. 4-6, 2014.
European Patent Office Communication Pursuant to Article 94 (3) dated May 7, 2020 for corresponding European Application No. 17724946.3.
Japanese Office Action dated May 26, 2020 for corresponding Japanese Application No. 2016-099955.
Russian Office Action dated Jul. 14, 2020 for corresponding Russian Application No. 2018139479.
Taiwanese Office Action dated Jun. 28, 2021 for corresponding Taiwan Application No. 106114885.
Korean Office Action dated Jun. 28, 2021 for corresponding Korean Application No. 10-2018-7031445.
Intellectual Property Office of India Office Action dispatched Jul. 13, 2021 for corresponding India Application No. 201817042243.
3GPP,Feb. 28, 2014, "Machine-to-Machine communications (M2M) et al. Technical Report Machine-to-Machine communicalions (M2M); Interworking between the M2M Architecture and M2M Area Network technologies" pp. 74-88.

* cited by examiner

COMMUNICATION DEVICE, COMMUNICATION METHOD, PROGRAM, AND COMMUNICATION SYSTEM

TECHNICAL FIELD

The present disclosure relates to a communication device, a communication method, a program, and a communication system, and more particularly, relates to a communication device, a communication method, a program, and a communication system enabling more reliable communication.

CROSS REFERENCE TO RELATED APPLICATIONS

This application claims the benefit of Japanese Priority Patent Application JP 2016-099955 filed May 18, 2016, the entire contents of which are incorporated herein by reference.

BACKGROUND ART

Currently, a bus interface (IF) used to communicate between devices via a bus inside a board on which multiple devices are mounted, such as Inter-Integrated Circuit (I2C), for example, is being used widely.

Also, recently, there has been demand to achieve faster I2C speeds, and the establishment of Improved Inter-Integrated Circuit (I3C) as a next-generation standard is progressing. With I3C, a master and a slave are able to communicate bidirectionally using two signal lines. For example, data transfer from the master to the slave (write transfer) and data transfer from the slave to the master (read transfer) are conducted.

For example, Patent Literature 1 discloses a digital data processing system in which a host processor and a subsystem controller are interconnected by I2C. Also, Patent Literature 2 discloses a method of realizing a communication protocol deployed in a higher layer above the standard I2C protocol.

CITATION LIST

Patent Literature

PTL 1: JP 2000-99448A
PTL 2: JP 2002-175269A

SUMMARY OF INVENTION

Technical Problem

Meanwhile, I3C as described above stipulates that error detection using a method such as parity or a cyclic redundancy check (CRC) is to be conducted between master and slave, for example, but signals for which such error detection is not made available are also transmitted and received. For this reason, when an error occurs in a signal for which error detection is not available, there is concern that the master and slave may become unable to conduct normal communication.

The present disclosure has been devised in light of such circumstances, and enables communication to be conducted more reliably.

Solution to Problem

A communication device according to a first aspect of the present disclosure includes: a transmission and reception unit that transmits and receives a signal with an other communication device; an error detection unit that detects an occurrence of an error by having the transmission and reception unit receive a preamble specifying a type of data to be transmitted next, and comparing a bit sequence of a signal received following the preamble to a bit sequence that should be transmitted for the type specified for transmission by the preamble; and a conflict avoidance unit that, if the occurrence of an error is detected by the error detection unit, instructs the transmission and reception unit to transmit a clock corresponding to a certain number of bits following the preamble, and then transmit an abort signal giving an instruction to terminate communication partway through.

A communication method or a program according to the first aspect of the present disclosure includes: transmitting and receiving a signal with an other communication device; detecting an occurrence of an error by having a preamble specifying a type of data to be transmitted next be received, and comparing a bit sequence of a signal received following the preamble to a bit sequence that should be transmitted for the type specified for transmission by the preamble; and if the occurrence of an error is detected, transmitting a clock corresponding to a certain number of bits following the preamble, and then transmitting an abort signal giving an instruction to terminate communication partway through.

In the first aspect of the present disclosure, transmitting and receiving of a signal is performed with an other communication device, and an occurrence of an error is detected by having a preamble specifying a type of data to be transmitted next be received, and comparing a bit sequence of a signal received following the preamble to a bit sequence that should be transmitted for the type specified for transmission by the preamble. Then, if the occurrence of an error is detected, a clock corresponding to a certain number of bits following the preamble is transmitted, and then an abort signal giving an instruction to terminate communication partway through is transmitted.

A system according to a second aspect of the present disclosure includes: a first communication device having a control initiative on a bus; and a second communication device that conducts communication under control by the first communication device. The first communication device includes a transmission and reception unit that transmits and receives a signal with the second communication device, an error detection unit that detects an occurrence of an error by having the transmission and reception unit receive a preamble specifying a type of data to be transmitted next, and comparing a bit sequence of a signal received following the preamble to a bit sequence that should be transmitted for the type specified for transmission by the preamble, and a conflict avoidance unit that, if the occurrence of an error is detected by the error detection unit, instructs the transmission and reception unit to transmit a clock corresponding to a certain number of bits following the preamble, and then transmit an abort signal giving an instruction to terminate communication partway through.

In the second aspect of the present disclosure, communication is conducted by a first communication device having a control initiative on a bus, and a second communication device that communicates in accordance with control by the first communication device. Additionally, in the first communication device, signals are transmitted and received to and from the second communication device, a preamble specifying the type of data to be transmitted next is received, and the occurrence of an error is detected by comparing the bit sequence of the signal received following the preamble to the bit sequence that should be transmitted for the type specified for transmission by the preamble. Subsequently, if the occurrence of an error is detected, after a clock corresponding to a certain number of bits following the preamble is transmitted, an abort signal giving an instruction to terminate communication partway through is transmitted.

Advantageous Effects of Invention

According to the first and second aspects of the present disclosure, communication may be conducted more reliably.

DESCRIPTION OF EMBODIMENTS

Hereinafter, specific embodiments applying the present technology will be described in detail with reference to the drawings.

<Example Configuration of Bus IF>

Figure 1:
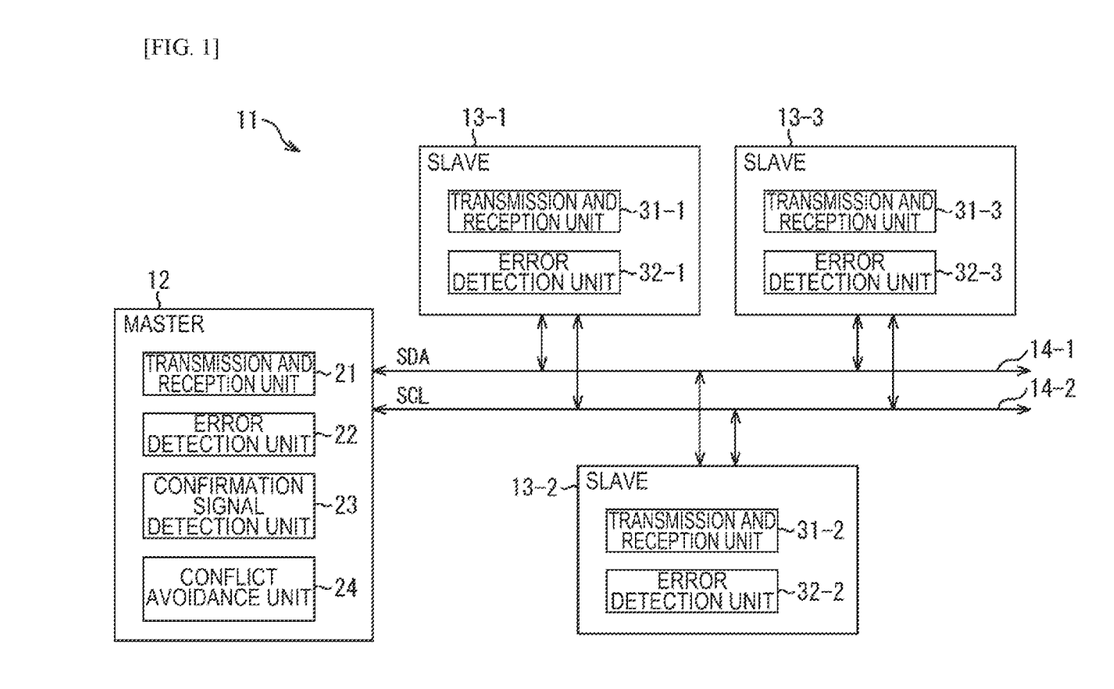
FIG. 1 is a block diagram illustrating an example configuration of an embodiment of a bus IF applying the present technology.

FIG. 1 is a block diagram illustrating an example configuration of an embodiment of a bus IF applying the present technology.

The bus IF 11 illustrated in FIG. 1 is made up of a master 12 and three slaves 13-1 to 13-3 connected to each other via a data signal line 14-1 and a clock signal line 14-2.

The master 12 has control initiative on the bus IF 11, and is able to communicate with the slaves 13-1 to 13-3 via the data signal line 14-1 and the clock signal line 14-2.

The slaves 13-1 to 13-3, under control by the master 12, are able to communicate with the master 12 via the data signal line 14-1 and the clock signal line 14-2. Note that the slaves 13-1 to 13-3 are configured similarly to each other, and hereinafter will be designated simply the slave 13 when not being individually distinguished. This applies similarly to the respective blocks constituting the slave 13.

The data signal line 14-1 and the clock signal line 14-2 are used to relay signals between the master 12 and the slave 13. For example, in the bus IF 11, serial data (SDA) is relayed sequentially one bit at a time via the data signal line 14-1, while a serial clock (SCL) of a certain frequency is relayed via the clock signal line 14-2.

Also, in the bus IF 11, multiple transmission schemes with different communication speeds are stipulated in accordance with the I3C standard, and the master 12 is able to switch among these transmission schemes. For example, in the bus IF 11, depending on the data transfer rate, a standard data rate (SDR) mode in which data communication is conducted at a standard transfer rate, and a high data rate (HDR) mode in which data communication is conducted at a higher transfer rate than SDR mode are stipulated. Also, in HDR mode, three modes are defined by the standard, namely a double data rate (DDR) mode, a ternary symbol pure-bus (TSP) mode, and a ternary symbol legacy-inclusive bus (TSL) mode. Note that in the bus IF 11, it is stipulated that communication is conducted in SDR mode when starting communication.

The master 12 is provided with a transmission and reception unit 21, an error detection unit 22, a confirmation signal detection unit 23, and a conflict avoidance unit 24.

The transmission and reception unit 21 transmits and receives signals to and from the slave 13 via the data signal line 14-1 and the clock signal line 14-2. For example, the transmission and reception unit 21 transmits a signal to the slave 13 by driving the data signal line 14-1 (switching the electric potential to H level or L level) in accordance with the timings of the serial clock transmitted by driving the clock signal line 14-2. In addition, the transmission and reception unit 21 receives a signal transmitted from the slave 13 as a result of the slave 13 driving the data signal line 14-1 in accordance with the timings of the serial clock on the clock signal line 14-2. Note that the driving of the clock signal line 14-2 is continually conducted by the master 12 side.

The error detection unit 22 detects an error occurring in a signal received by the transmission and reception unit 21. For example, the error detection unit 22 is able to detect an error by conducting a check such as a parity check or a cyclic redundancy check (CRC) on a signal received by the transmission and reception unit 21, or by confirming a token issued when shifting the transmission right from the slave 13 to the master 12. Additionally, when the error detection unit 22 detects that an error is occurring in a signal received by the transmission and reception unit 21, for example, the error detection unit 22 is able to instruct the transmission and reception unit 21 to restart communication with the slave 13 from the beginning.

For example, between two bits of parity included in data transmitted from the slave 13, the error detection unit 22 may treat one as even parity and the other as odd parity, and detect the occurrence of an error by conducting a parity check on data received by the transmission and reception unit 21. Consequently, even if a state occurs in which the data signal line 14-1 is not being driven by either the master 12 or the slave 13, the error detection unit 22 is still able to detect whether or not the data is correct.

The confirmation signal detection unit 23 detects an acknowledgement signal (ACK) or a negative acknowledgement signal (NACK) transmitted from the slave 13 that receives a signal transmitted from the transmission and reception unit 21, and thereby confirms whether or not the slave 13 successfully received information such as a command or data. For example, in the bus IF 11, it is stipulated that when an error does not occur in the signal, and the slave 13 successfully receives information such as a command or data, an ACK is to be transmitted from the slave 13 to the master 12. Also, in the bus IF 11, it is stipulated that when an error occurs in the signal, and the slave 13 fails to receive information such as a command or data, a NACK is to be transmitted from the slave 13 to the master 12.

Consequently, in the case of detecting an ACK transmitted from the slave 13 in response to information such as a command or data transmitted from the master 12, the confirmation signal detection unit 23 is able to confirm that the slave 13 has successfully received the information such as a command or data. On the other hand, in the case of detecting a NACK transmitted from the slave 13 in response to information such as a command or data transmitted from the master 12, the confirmation signal detection unit 23 is able to confirm that the slave 13 has failed to receive the information such as a command or data.

Regarding the conflict avoidance unit 24, as described later with reference to FIG. 3, for example, when the transmission and reception unit 21 receives a preamble with an instruction to transmit a CRC word, and the error detection unit 22 detects the occurrence of a token error or a CRC error in the signal received following the preamble, after a clock corresponding to a certain number of bits following the preamble is transmitted, the conflict avoidance unit 24 instructs the transmission and reception unit 21 to transmit an abort signal giving an instruction to terminate communication partway through. Consequently, the conflict avoidance unit 24 is able to avoid the occurrence of a conflict due to read data transmitted from the slave 13 and an HDR exit command transmitted from the master 12, for example.

In addition, if the confirmation signal detection unit 23 detects a NACK, for example, after ignoring a certain number of bits following the NACK, the conflict avoidance unit 24 instructs the transmission and reception unit 21 to transmit an abort signal giving an instruction to terminate communication partway through. Consequently, the conflict avoidance unit 24 is able to avoid the occurrence of a conflict due to read data transmitted from the slave 13 and an HDR exit command transmitted from the master 12, for example.

The slave 13 is provided with a transmission and reception unit 31, and an error detection unit 32.

The transmission and reception unit 31 transmits and receives signals to and from the master 12 via the data signal line 14-1 and the clock signal line 14-2. For example, the transmission and reception unit 31 receives a signal transmitted from the master 12 as a result of the master 12 driving the data signal line 14-1 in accordance with the timings of the serial clock on the clock signal line 14-2. Also, the transmission and reception unit 31 transmit to the master 12 by driving the data signal line 14-1 in accordance with the timings of the serial clock on the clock signal line 14-2.

The error detection unit 32 detects an error occurring in a signal received by the transmission and reception unit 31, similarly to the error detection unit 22 of the master 12. Additionally, when an error does not occur in a signal received by the transmission and reception unit 31, the error detection unit 32 causes the transmission and reception unit 31 to transmit to the master 12 an ACK informing the master 12 that the information relayed by the signal, such as a command or data, has been received successfully. On the other hand, when an error occurs in a signal received by the transmission and reception unit 31, the error detection unit 32 causes the transmission and reception unit 31 to transmit to the master 12 a NACK informing the master 12 that the information relayed by the signal, such as a command or data, has failed to be received.

Furthermore, when an error occurs in a signal received by the transmission and reception unit 31, and normal communication is unavailable, for example, the error detection unit 32 causes the slave 13 to ignore all subsequent communication, stop responding to the master 12, and enter a standby state.

In the bus IF 11 configured as above, the master 12 and the slave 13 are able to transmit and receive signals via the data signal line 14-1 and the clock signal line 14-2, and are able to communicate more reliably by avoiding the occurrence of conflicts with the conflict avoidance unit 24.

<Explanation of Conflict Occurrence>

At this point, before describing a technique of avoiding the occurrence of a conflict with the conflict avoidance unit 24, the occurrence of a conflict will be described with reference to FIG. 2.

In the bus IF 11, it is stipulated that while in DDR mode, a 2-bit signal called a preamble is used to specify the type of data to transmit next. However, since error detection by parity or CRC is not made available for the preamble, if an error occurs in the preamble, the error may not be detected.

For example, in the preamble after the slave 13 transmits read data in accordance with to a read command with an instruction to read out data from the master 12, it is stipulated that the first bit is driven by the slave 13, while the second bit is kept at H level (High-Keeper). Additionally, with the first bit, the slave 13 is able to notify the master 12 that one of either a CRC word or read data is to be transmitted next. For example, in the case of transmitting a CRC word following the preamble, it is stipulated that the first bit of the preamble after transmitting the read data is driven at 0. On the other hand, in the case of transmitting read data following the preamble, it is stipulated that the first bit of the preamble after transmitting the read data is driven at 1.

However, if a 1-bit error occurs in the first bit of this preamble and the value of the bit is inverted, for example, the master 12 misrecognizes between read data being transmitted next and a CRC word being transmitted next.

Figure 2:
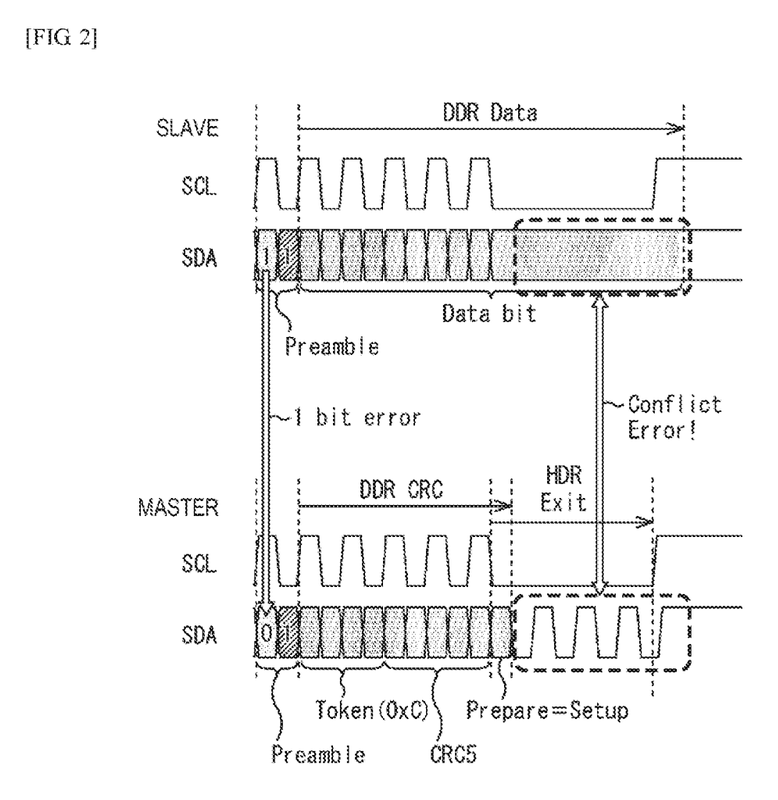
FIG. 2 is a diagram explaining a conflict error.

In other words, as illustrated in the upper part of FIG. 2, in the case of transmitting read data, the slave 13 drives the first bit of the preamble at 1, and transmits the read data (DDR Data) following the preamble. Note that in FIG. 2, the portion with gray hatching applied represents the portion driven by the slave 13, while the portion with diagonal hatching applied represents the portion kept at H level.

In contrast, in a case in which a 1-bit error occurs in the first bit of the preamble, and the first bit of the preamble becomes 0, as illustrated in the lower part of FIG. 2, the master 12 misrecognizes that a CRC word (DDR CRC) is to be transmitted from the slave 13. Consequently, in this case, the master 12, after receiving 10 bits corresponding to the CRC word (Token (0xC), CRC5, and Prepare=Setup), transmits an HDR exit command (HDR Exit) with an instruction to end communication in HDR mode.

As a result, there is a risk that (the latter half of) the read data transmitted from the slave 13 and the HDR exit command transmitted from the master 12 may conflict. Consequently, after that, it is conceivable that even though the master 12 has transmitted the HDR exit command, the slave 13 is unable to receive the HDR exit command normally and thus is unable to exit HDR mode, and the bus IF 11 deadlocks, resulting in a state in which communication is unavailable.

Accordingly, in the bus IF 11, if the master 12 has received a preamble specifying the transmission of a CRC word, but the signal received following the preamble does not match the CRC word (that is, if a token error or a CRC error occurs), it is inferred that a 1-bit error has occurred in the preamble. Additionally, in this case, it is stipulated that the master 12, after transmitting an additional clock of a certain number of bits following the CRC word, transmits an abort signal giving an instruction to terminate communication partway through. As a result, even if a 1-bit error like the above occurs, it is possible to avoid the occurrence of a conflict between read data transmitted from the slave 13 and an HDR exit command transmitted from the master 12.

<Explanation of Conflict Avoidance>

Figure 3:
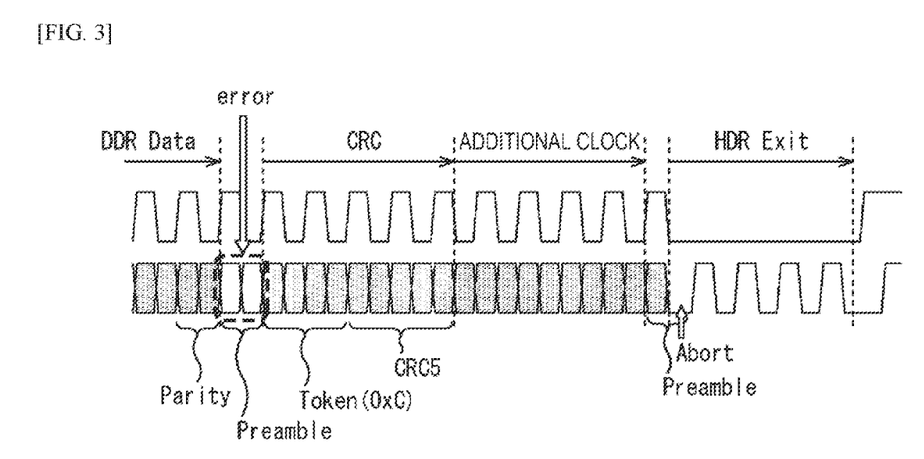
FIG. 3 is a diagram illustrating an example of a format that avoids a conflict error.

FIG. 3 illustrates a format in which, in the bus IF 11, the master 12 adds a clock for conflict prevention to avoid a conflict due to the occurrence of a 1-bit error in the first bit of the preamble after read data is transmitted.

As illustrated in FIG. 3, in the bus IF 11, if the master 12 infers that an error occurred in the preamble following read data (DDR Data) transmitted from the slave 13, it is stipulated that the master 12 transmits a 9-bit additional clock corresponding to the difference between the CRC word and the read data. Additionally, data received during the transmission of the additional clock is ignored.

In other words, as described with reference to FIG. 2, suppose that a 1-bit error occurs in the first bit of the preamble following read data, and even though the slave 13 transmits read data, the master 12 misrecognizes that a CRC word is to be transmitted. In this case, the master 12 detects that token error or a CRC error occurs in the 9 bits corresponding to the CRC word, and is able to infer that these errors are due to the occurrence of a 1-bit error in the preamble.

At this point, in the bus IF 11, it is stipulated that the slave 13 receives a read command (READ CMD), and transmits 18-bit read data (DDR Data) following the subsequent preamble. Furthermore, in the bus IF 11, it is stipulated that in the preamble after the read data is transmitted from the slave 13, the first bit is driven by the slave 13, while the second bit is driven by the master 12. Additionally, in the bus IF 11, the case in which the second bit of the preamble is 0 is stipulated as an abort signal giving an instruction from the master 12 to the slave 13 to perform a master abort that terminates communication partway through. Note that to perform the master abort reliably, the master 12 continually drives the second bit of the preamble transmitted and received after the read data.

Consequently, as illustrated in FIG. 3, when the second bit of the preamble following the additional clock is driven at 0, the slave 13 detects that an abort signal has been transmitted from the master 12, and is able to abort transmission of the read data. As a result, if the master 12 transmits an HDR exit command (HDR Exit) following the preamble, the slave 13 is able to exit HDR mode in accordance with the HDR exit command. After that, the master 12 and the slave 13 restart communication from SDR mode.

In other words, in the case of detecting a token error or a CRC error, the master 12 infers a preamble error. Subsequently, as illustrated in FIG. 2, the master 12 does not transmit the HDR exit command immediately after transmitting the CRC word, but instead, as illustrated in FIG. 3, transmits an additional clock following the CRC word, transmits the preamble following the additional clock, and then transmits the HDR exit command.

As a result, even if the master 12 detects that the first bit is 0 in the preamble after read data is received, the master 12 is able to avoid the occurrence of a conflict as described with reference to FIG. 2. In other words, even if the preamble by which the slave 13 transmits read data is misrecognized as the preamble by which the master 12 transmits a CRC word, it is possible to avoid the bus IF 11 becoming deadlocked, and conduct communication more reliably.

<Communication Method that Avoids Conflict Occurrence>

Figure 4:
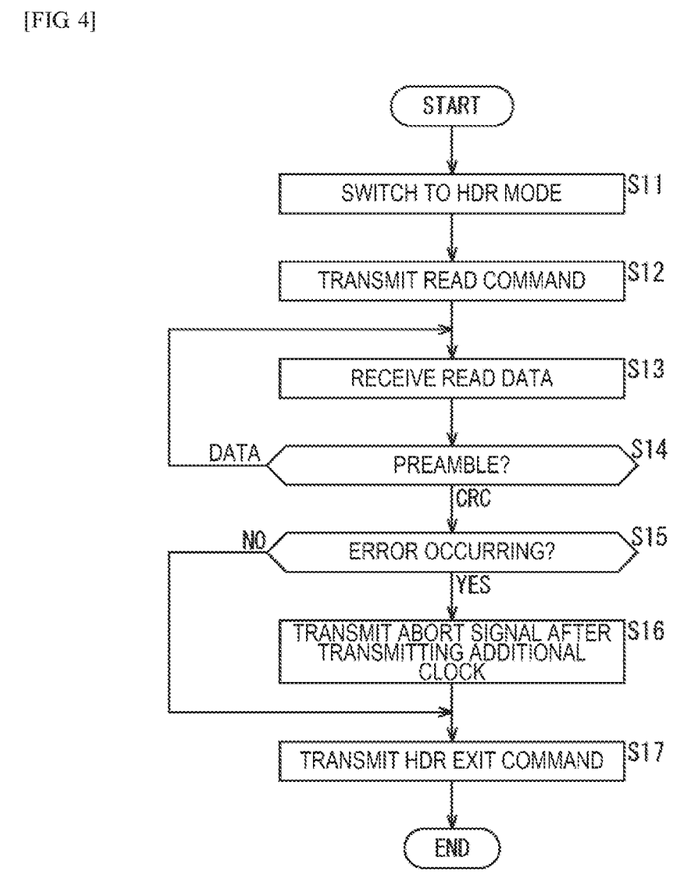
FIG. 4 is a flowchart that explains a communication process in a DDR mode of a master.

FIG. 4 is a flowchart explaining a communication process (DDR Read) by which the master 12 reads out data from the slave 13 in DDR mode, which is one of the HDR modes.

In step S11, the master 12 conducts a process of switching communication from SDR mode to HDR mode. Specifically, in the master 12, the transmission and reception unit 21 drives the data signal line 14-1 and the clock signal line 14-2, and in SDR mode, transmits a broadcast command (0x7E+R/W=0) indicating that a command will be transmitted to all of the slaves 13 constituting the bus IF 11 at once. After that, in the master 12, when the confirmation signal detection unit 23 receives an ACK transmitted from each slave 13 to confirm that the broadcast command has been received successfully, the transmission and reception unit 21 transmits a common command code for entering MDR mode (ENTHDR CCC(0x20)).

In step S12, the transmission and reception unit 21 of the master 12 drives the data signal line 14-1 and the clock signal line 14-2 to transmit a read command.

In step S13, the transmission and reception unit 21 receives read data transmitted from the slave 13 in response to the read command transmitted in step S12, and in addition, also receives a preamble transmitted following the read data.

In step S14, the transmission and reception unit 21 determines whether the preamble received in step S13 specifies the transmission of read data or a CRC word.

In step S14, if the transmission and reception unit 21 determines that the preamble specifies the transmission of read data, the process returns to step S13, and thereafter, a similar process is repeated. On the other hand, in step S14, if the transmission and reception unit 21 determines that the preamble specifies the transmission of a CRC word, the process proceeds to step S15.

In step S15, the transmission and reception unit 21 receives a signal transmitted following the preamble received in step S13, and the error detection unit 22 determines whether or not an error is occurring in the signal.

In step S15, if the error detection unit 22 determines that an error is occurring in the signal transmitted following the preamble specifying the transmission of a CRC word, the process proceeds to step S16. In other words, in this case, if a token error or a CRC error is detected by the error detection unit 22, the conflict avoidance unit 24 infers that an error has occurred in the preamble.

In step S16, the error detection unit 22 transmits an additional clock as described with reference to FIG. 3, and after that, instructs the transmission and reception unit 21 to transmit an abort signal giving an instruction to terminate communication partway through. Correspondingly, the transmission and reception unit 21 transmits an abort signal to the slave 13 after transmitting the additional clock.

After the processing in step S16, the transmission and reception unit 21 transmits an HDR exit command following the additional clock. Also, even in the case of determining that an error is not occurring in step S15, in step S17, the transmission and reception unit 21 transmits an HDR exit command. Consequently, the communication process of reading out data from the slave 13 (DDR Read) in DDR mode by the master 12 is ended.

As above, in the bus IF 11, even if a 1-bit error occurs in the preamble giving an instruction to transmit read data transmitted by the slave 13, it is possible to avoid the occurrence of a conflict, and conduct communication more reliably.

<Circuit Diagram of Master>

Figure 5:
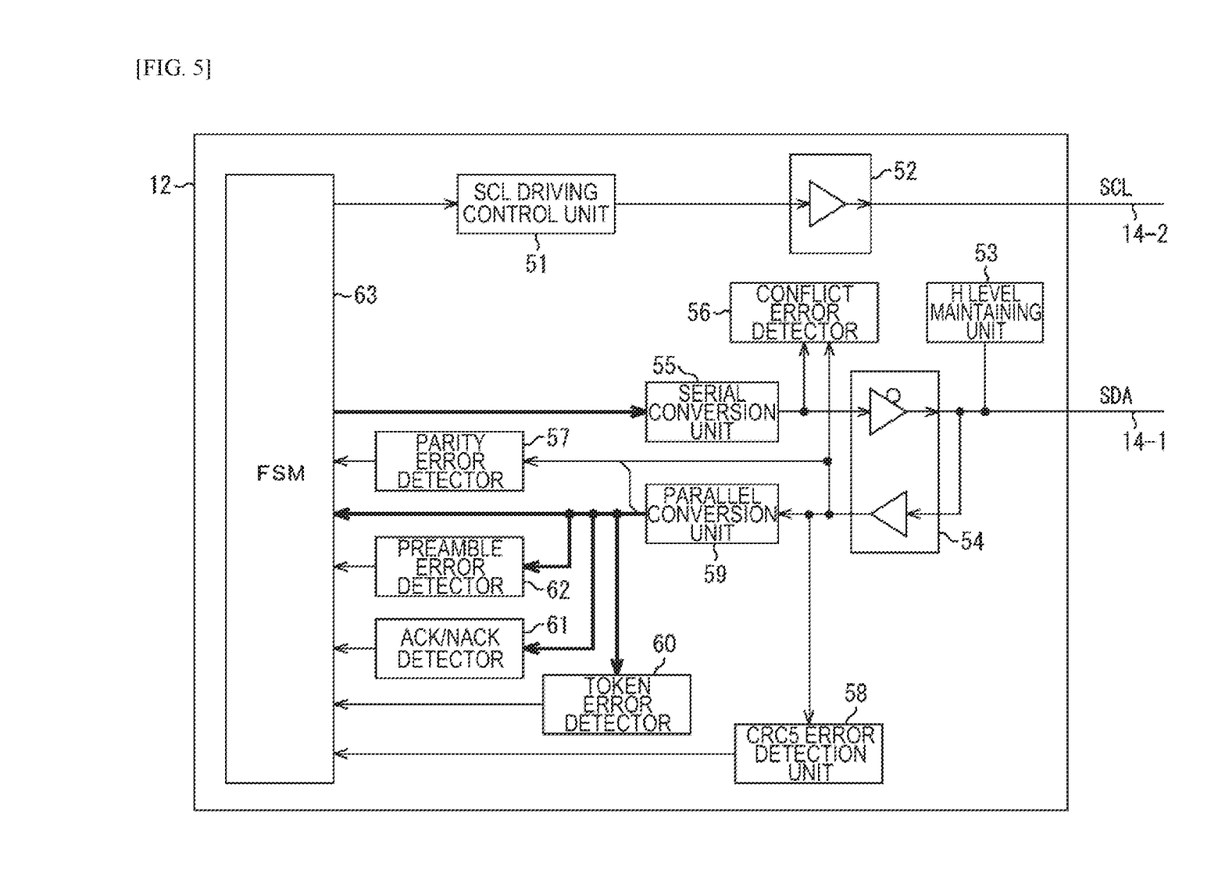
FIG. 5 is a circuit diagram illustrating an example configuration of a master.

Next, FIG. 5 is a circuit diagram illustrating an example configuration of the master 12.

As illustrated in FIG. 5, the master 12 is provided with an SCL driving control unit 51, an amplification unit 52, an H level maintaining unit 53, an amplification unit 54, a serial conversion unit 55, a conflict error detector 56, a parity error detector 57, a CRC5 error detection unit 58, a parallel conversion unit 59, a token error detector 60, an ACK/NACK detector 61, a preamble error detector 62, and a finite state machine (FSM) 63.

The SCL driving control unit 51, following a signal at a frequency that acts as a reference output from the state machine 63, generates a serial clock to provide to the slave 13 via the clock signal line 14-2, and controls the driving of the clock signal line 14-2.

The amplification unit 52 amplifies the clock signal generated by the SCL driving control unit 51 up to a certain level necessary for transmission via the clock signal line 14-2, and outputs to the clock signal line 14-2.

The H level maintaining unit 53 maintains the level of the data signal line 14-1 at H level.

The amplification unit 54 amplifies and outputs serial data transmitted via the data signal line 14-1 up to a certain level, and amplifies serial data transmitted via the data signal line 14-1 to a level necessary for processing internally inside the master 12.

The serial conversion unit 55 converts and outputs parallel data output from the state machine 63 as serial data.

The conflict error detector 56 compares serial data output from the serial conversion unit 55 to serial data transmitted via the data signal line 14-1, and thereby detects a conflict error on the data signal line 14-1.

The parity error detector 57, using parity bits added to detect a bit error on the basis of oddness or evenness, detects an error in serial data transmitted via the data signal line 14-1, and reports the error detection result to the state machine 63.

The CRC5 error detection unit 58 corresponds to the error detection unit 22 in FIG. 1, and by using 5-bit data added to detect a bit error on the basis of a CRC, detects an error in serial data transmitted via the data signal line 14-1, and reports the error detection result to the state machine 63.

The parallel conversion unit 59 converts and outputs serial data transmitted via the data signal line 14-1 as parallel data.

The token error detector 60 corresponds to the error detection unit 22 in FIG. 1, and by checking the bit sequence of a token included in parallel data converted by the parallel conversion unit 59, detects whether or not an error has occurred in the token, and reports the error detection result to the state machine 63.

The ACK/NACK detector 61 corresponds to the confirmation signal detection unit 23 in FIG. 1, detects from the parallel data converted by the parallel conversion unit 59 an ACK or a NACK transmitted from the slave 13, and reports the detection result (ACK/NACK) to the state machine 63.

The preamble error detector 62 detects whether or not an error has occurred in the preamble included in parallel data converted by the parallel conversion unit 59, and reports the error detection result to the state machine 63.

The state machine 63 is a sequential circuit whose next state is determined in accordance with an input condition and the current state, and functions as the transmission and reception unit 21 and the conflict avoidance unit 24 in FIG. 1, for example. In other words, the state machine 63 takes the error detection results from the CRC5 error detection unit 58 and the token error detector 60 as inputs, and if neither a token error nor a CRC error has occurred, enters a state that ends HDR mode normally. On the other hand, if a token error and a CRC error have occurred, the state machine 63 transmits an additional clock following the CRC word, and enters a state of transmitting an abort signal with the second bit of the subsequent preamble.

The master 12 is configured in this way, and as described above, even if the preamble giving an instruction for the transmission of read data transmitted by the slave 13 is misrecognized as the preamble by which a CRC word is transmitted, it is possible to avoid the bus IF 11 becoming deadlocked, and conduct communication more reliably.

However, in the bus IF 11, when the number of bits in a CRC word is prescribed to be 9 bits (a 4-bit token and a 5-bit CRC5), different from the number of bits in read data (18 bits), a conflict occurs as described earlier. Accordingly, for example, when stipulating a format in which the number of bits in a CRC word becomes the same 18 bits as the number of bits in read data, the occurrence of a conflict may be avoided.

Figure 6:
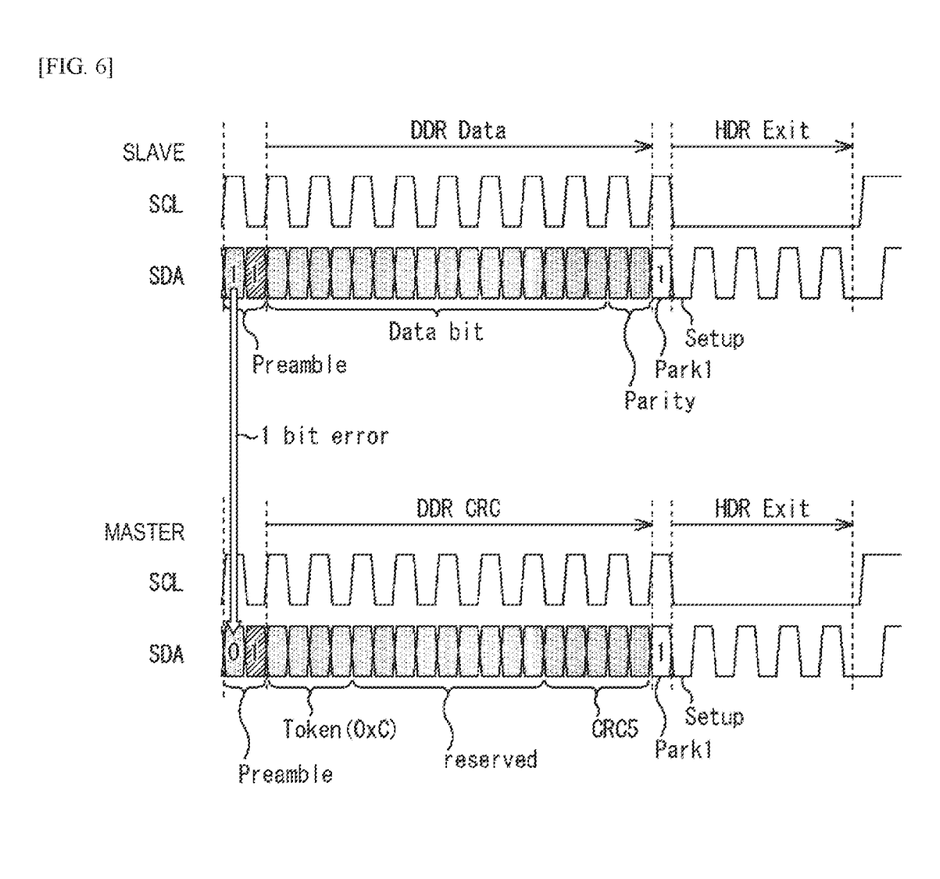
FIG. 6 is a diagram illustrating another example of a format that avoids a conflict error.

In other words, as illustrated in FIG. 6, word alignment is conducted by adopting as the format of the CRC word a format in which 9 reserved bits have been inserted between the token (Token(0xC)) and the CRC5. Thus, it is no longer necessary to transmit an additional clock. The number of reserved bits corresponds to the different between the number of bits in the token and the CRC5 (9 bits), and the number of bits in the read data (18 bits). Additionally, even in the case of using a CRC word in such a format, if the master 12 detects any of a token error, a CRC error, and reception of a CRC word of a certain length or less after receiving a preamble with a bit sequence of 0 and 1, in order to stop the slave 13 safely, the master 12 is subsequently able to end communication similarly to a normal master abort.

Also, as illustrated in FIG. 6, communication may be ended early safely by having the driving of the data signal line 14-1 be switched from the slave 13 to the master 12 in accordance with the bit immediately after reception of the CRC word.

Note that, although the embodiment described above with reference to FIG. 3 describes an example in which the master 12 transmits an HDR exit command following a preamble after an additional clock is transmitted, the configuration is not limited to the transmission of the HDR exit command, insofar as the conflict may be avoided and communication may be recovered.

Figure 7:
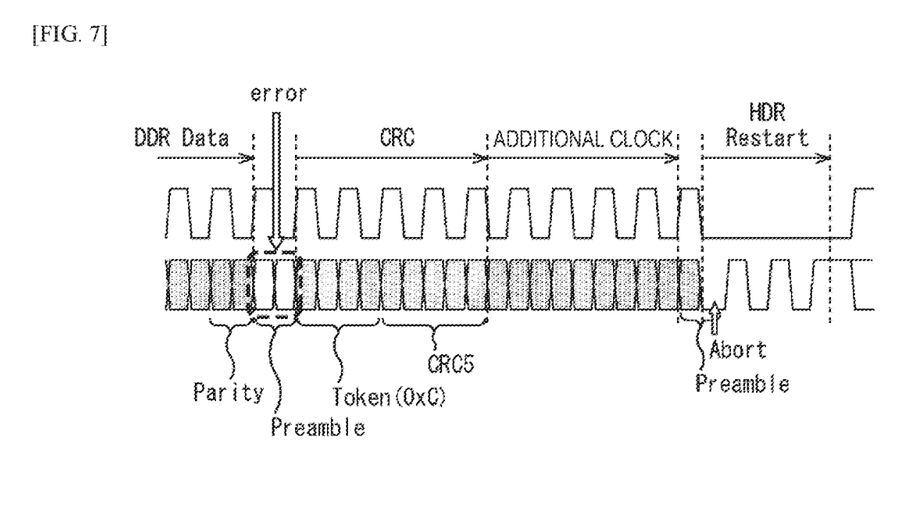
FIG. 7 is a diagram illustrating another example of a format that avoids a conflict error.

For example, as illustrated in FIG. 7, following the preamble after an additional clock is transmitted, instead of the HDR exit command in FIG. 3, the master 12 may transmit an HDR restart command (HDR Restart) giving an instruction to restart communication in HDR mode. In this way, in the bus IF 11, after communication is terminated partway through in accordance with a master abort, communication may be resumed with the HDR restart command.

Note that, for example, the conflict avoidance unit 24 may also infer that an error has occurred if the transmission and reception unit 21 receives a CRC word rather than receiving read data of a certain length, and instruct the transmission and reception unit 21 to transmit an abort signal after transmitting an additional clock as described earlier.

Note that the present technology is not limited to a bus IF 11 conforming to the I3C standard, and may also be applied to a bus IF 11 conforming to another standard. In addition, in the bus IF 11 illustrated in FIG. 1, an example configuration is illustrated in which slaves 13-1 to 13-3 are connected, but there may also be one or two slaves 13, or three or more slaves 13, for example.

It should be appreciated that the operations described with reference to the flowchart described earlier are not limited to being processed in a time series following the order depicted in the flowchart, but may also be processed in parallel or individually (such as by parallel processing or object-orientated processing, for example). Furthermore, while the program may be processed by a single CPU, the program may also be processed in a distributed manner by a plurality of CPUs.

Also, in this specification, the term "system" represents the totality of an apparatus composed of a plurality of apparatus.

Also, the foregoing series of operations may be executed in hardware, and may also be executed in software. In the case of executing the series of operations in software, a program constituting such software may be installed from a program recording medium storing the program onto a computer built into special-purpose hardware, or alternatively, onto a computer capable of executing various functions by installing various programs thereon, such as a general-purpose personal computer, for example.

<Example Hardware Configuration>

Figure 8:
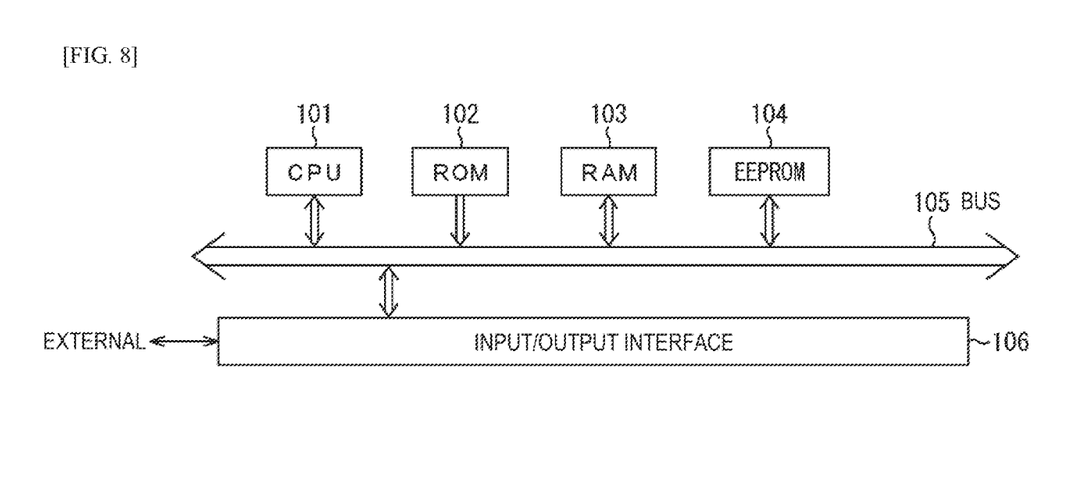
FIG. 8 is a block diagram illustrating an example configuration of an embodiment of a computer applying the present technology.

FIG. 8 is a block diagram illustrating an exemplary hardware configuration of a computer that executes the foregoing series of processes in accordance with a program.

In the computer, a central processing unit (CPU) 101, read-only memory (ROM) 102, random access memory (RAM) 103, and electrically erasable and programmable read-only memory (EEPROM) 104 are connected to each other by a bus 105. Also connected to the bus 105 is an input/output interface 106, and the input/output interface 106 is connected to external equipment (for example, the data signal line 14-1 and the clock signal line 14-2 in FIG. 1).

In a computer configured as above, the foregoing series of processes is conducted as a result of the CPU 101 loading a program stored in the ROM 102 or the EEPROM 104 into the RAM 103 via the bus 105, and executing the program, for example. Also, the program executed by the computer (CPU 101), besides being written to the ROM 102 in advance, may also be installed and updated in the EEPROM 104 from an external source via the input/output interface 106.

Additionally, the present technology may also be configured as below.

(1)

A communication device, including:

a transmission and reception unit that transmits and receives a signal with an other communication device;

an error detection unit that detects an occurrence of an error by having the transmission and reception unit receive a preamble specifying a type of data to be transmitted next, and comparing a bit sequence of a signal received following the preamble to a bit sequence that should be transmitted for the type specified for transmission by the preamble; and a conflict avoidance unit that, if the occurrence of an error is detected by the error detection unit, instructs the transmission and reception unit to transmit a clock corresponding to a certain number of bits following the preamble, and then transmit an abort signal giving an instruction to terminate communication partway through.

(2)

The communication device according to (1), wherein if a preamble received by the transmission and reception unit specifies transmission of a cyclic redundancy check (CRC) word including a token and a CRC5, but a token error or a CRC error is detected by the error detection unit on the basis of a bit sequence in a signal received following the preamble, the conflict avoidance unit causes the abort signal to be transmitted after transmitting, following the preamble, a clock according to a number of bits in the CRC word, and an additional clock corresponding to a difference between the number of bits in the CRC word and a number of bits in read data read out from the other communication device.

(3)

The communication device according to (2), wherein the conflict avoidance unit ignores a signal received by the transmission and reception unit during transmission of the additional clock.

(4)

The communication device according to (3), wherein the transmission and reception unit transmits the abort signal at a timing of a second bit of a 2-bit preamble transmitted and received following the read data when the read data is transmitted from the other communication device.

(5)

The communication device according to (2), wherein if a preamble received by the transmission and reception unit specifies transmission of a cyclic redundancy check (CRC) word including a token and a CRC5, but a token error or a CRC error is detected by the error detection unit on the basis of a bit sequence in a signal received following the preamble, the conflict avoidance unit causes the abort signal to be transmitted after transmitting a clock with a number of bits corresponding to the CRC word in which is used a format made up of the token, the CRC5, and a number of reserved bits corresponding to a difference between the token and the CRC5 and a number of bits when data is read out from the other communication device.

(6)

The communication device according to any one of (1) to (5), wherein the transmission and reception unit transmits, following the abort signal, a command giving an instruction to exit a specific communication mode.

(7)

The communication device according to any one of (1) to (5), wherein the transmission and reception unit transmits, following the abort signal, a command giving an instruction to restart communication in a specific communication mode.

(8)

The communication device according to any one of (1) to (7), further including:

an acknowledgement signal detection unit that detects either an acknowledgement signal or a negative acknowledgement signal transmitted from the other communication device that has received a signal transmitted from the transmission and reception unit, wherein when the negative acknowledgement signal is detected by the acknowledgement signal detection unit, the conflict avoidance unit instructs the transmission and reception unit to transmit the abort signal after ignoring a certain number of bits following the negative acknowledgement signal.

(9)

The communication device according to any one of (1) to (8), wherein the transmission and reception unit receives read data read out from the other communication device, and continually drives a second bit of a preamble transmitted and received after the read data.

(10)

The communication device according to any one of (1) to (9), wherein the transmission and reception unit drives a data signal line from a bit immediately after reception of a cyclic redundancy check (CRC) word transmitted by the other communication device driving the data signal line.

(11)

The communication device according to any one of (1) to (10), wherein between two bits of parity included in the data, the error detection unit treat one as even parity and the other as odd parity, and detects an occurrence of an error by conducting a parity check on data received by the transmission and reception unit.

(12)

The communication device according to any one of (1) to (11), wherein the transmission and reception unit is able to transmit and receive a signal in a standard data rate (SDR) mode in which data communication is conducted at a standard transfer rate, and a high data rate (HDR) mode in which data communication is conducted at a higher transfer rate than the SDR mode.

(13)

The communication device according to any one of (1) to (12), wherein the transmission and reception unit conducts communication via two signal lines, namely a data signal line that transmits serial data sequentially one bit at a time, and a clock signal line that transmits a serial clock of a certain frequency.

(14)

The communication device according to any one of (1) to (13), wherein the transmission and reception unit conducts communication in conformity with the improved Inter-Integrated Circuit (I3C) standard.

(15)

A communication method, including:

transmitting and receiving a signal with an other communication device;

detecting an occurrence of an error by having a preamble specifying a type of data to be transmitted next be received, and comparing a bit sequence of a signal received following the preamble to a bit sequence that should be transmitted for the type specified for transmission by the preamble; and if the occurrence of an error is detected, transmitting a clock corresponding to a certain number of bits following the preamble, and then transmitting an abort signal giving an instruction to terminate communication partway through.

(16)

A program for causing a computer to execute a communication process including:

transmitting and receiving a signal with an other communication device;

detecting an occurrence of an error by having a preamble specifying a type of data to be transmitted next be received, and comparing a bit sequence of a signal received following the preamble to a bit sequence that should be transmitted for the type specified for transmission by the preamble; and if the occurrence of an error is detected, transmitting a clock corresponding to a certain number of bits following the preamble, and then transmitting an abort signal giving an instruction to terminate communication partway through.

(17)

A system, including:

a first communication device having a control initiative on a bus; and a second communication device that conducts communication under control by the first communication device, wherein the first communication device includes a transmission and reception unit that transmits and receives a signal with the second communication device, an error detection unit that detects an occurrence of an error by having the transmission and reception unit receive a preamble specifying a type of data to be transmitted next, and comparing a bit sequence of a signal received following the preamble to a bit sequence that should be transmitted for the type specified for transmission by the preamble, and a conflict avoidance unit that, if the occurrence of an error is detected by the error detection unit, instructs the transmission and reception unit to transmit a clock corresponding to a certain number of bits following the preamble, and then transmit an abort signal giving an instruction to terminate communication partway through.

Note that the present embodiment is not limited to the embodiment described above, and various modifications are possible within a scope that does not depart from the gist of the present disclosure.

REFERENCE SIGNS LIST 11 bus IF
12 master
13 slave
14-1 data signal line
14-2 clock signal line
21 transmission and reception unit
22 error detection unit
23 confirmation signal detection unit
24 conflict avoidance unit
31 transmission and reception unit
32 error detection unit
51 SCL driving control unit
52 amplification unit
53 H level maintaining unit
54 amplification unit
55 serial conversion unit
56 conflict error detector
57 parity error detector
58 CRC5 error detection unit
59 parallel conversion unit
60 token error detector
61 ACK/NACK detector
62 preamble error detector
63 state machine

The invention claimed is:

1. A communication device, comprising:
transmission and reception circuitry configured to perform a communication with an external communication device, the communication including transmitting and receiving data via a data signal line and transmitting a clock via a clock signal line; and
control circuitry configured to
transmit a command giving an instruction to enter a predetermined data rate mode,
thereafter, detect an occurrence of an error in a signal by comparing a first bit sequence following a preamble of the data received to a second bit sequence corresponding to a data type designated by the preamble, and
in a case where the occurrence of the error is detected, cause the transmission and reception circuitry to transmit the clock via the clock signal line for a first duration corresponding to at least a predetermined number of bits following the preamble,
wherein when the preamble of the data specifies transmission of a cyclic redundancy check (CRC) word, the CRC word including a token and a CRC-5, and the control circuitry detects an occurrence of at least one of a token error or a CRC error on the basis of the first bit sequence, the transmission and reception circuitry transmits a command signal after transmitting the clock for a second duration, the second duration corresponding to at least a number of bits in the CRC word.

2. The communication device according to claim 1, wherein after transmitting an additional clock for the first duration, the predetermined number of bits corresponding to a difference between the number of bits in the CRC word and a number of bits in the data.

3. The communication device according to claim 2, wherein the control circuitry ignores the data for at least a period during transmission of the additional clock.

4. The communication device according to claim 3, wherein the transmission and reception circuitry transmits the command signal at a timing of a second bit of a preamble of the data transmitted.

5. The communication device according to claim 1, the control circuitry further configured to detect whether an acknowledgement signal or an absence of an acknowledgement signal transmitted from the external communication device in response to receiving the data transmitted from the transmission and reception circuitry, wherein in a case where the absence of an acknowledgement signal is detected, the control circuitry causes the transmission and reception circuitry to transmit a command signal after ignoring a predetermined number of bits following the absence of an acknowledgement signal.

6. The communication device according to claim 1, wherein a first parity bit and a second parity bit of a parity are included in the data and the error detection circuitry treats the first parity bit as even parity and the second parity bit as odd parity, and detects the occurrence of an error by conducting a parity check on the data received from the external communication device.

7. The communication device according to claim 1, wherein
the transmission and reception circuitry is able to transmit the data and receive the signal in an SDR mode in which data communication is conducted at a first transfer rate, and at least one HDR mode in which data communication is conducted at a second transfer rate, the second data rate being higher than the first data rate, and
the HDR mode includes the predetermined data rate mode.

8. The communication device according to claim 7, wherein the at least one HDR mode includes a plurality of additional modes in which the transmission and reception circuitry is capable of communicating, the plurality of additional modes including: a double data rate mode, a ternary symbol pure-bus mode, and a ternary symbol legacy-inclusive-bus mode.

9. The communication device according to claim 7, wherein the transmission and reception circuitry transmits a command giving an instruction to exit the at least one HDR mode after the first duration has elapsed.

10. The communication device according to claim 7, wherein the transmission and reception circuitry transmits a command giving an instruction to restart communication in the at least one HDR mode after the first duration has elapsed.

11. The communication device according to claim 1, wherein the transmission and reception circuitry conducts communication via a data signal line configured to transmit serial data sequentially one bit at a time, and a clock signal line configured to transmit a serial clock of a predetermined frequency.

12. The communication device according to claim 11, wherein the transmission and reception circuitry drives the data signal line from a bit immediately after receiving a cyclic redundancy check (CRC) word transmitted by the external communication device driving the data signal line.

13. The communication device according to claim 1, wherein the control circuitry is configured to detect that the error has occurred if a number of bits in the second bit sequence is smaller than a number of bits in the first bit sequence.

14. The communication device according to claim 1, wherein the control circuitry is configured to infer that the error has occurred due to the occurrence of a 1-bit error in a first bit of the preamble.

15. The communication device according to claim 1, wherein the transmission and reception circuitry conducts communication in conformity with the Improved Inter-Integrated Circuit (I3C) standard.

16. A communication method for a communication device, the method comprising:
communicating with an external communication device, the communicating including transmitting and receiving data via a data signal line and transmitting a clock via a clock signal line;
transmitting a command giving an instruction to enter a predetermined data rate mode;
thereafter, detecting an occurrence of an error in a signal by comparing a first bit sequence following a preamble of the data received to a second bit sequence corresponding to a data type designated by the preamble;
in a case where the occurrence of an error is detected, causing the transmission and reception circuitry to transmit the clock via the clock signal line for a duration corresponding to at least a predetermined number of bits following a preamble; and
when the preamble of the data specifies transmission of a cyclic redundancy check (CRC) word, the CRC word including a token and a CRC-5, and the control circuitry detects an occurrence of at least one of a token error or a CRC error on the basis of the first bit sequence, causing the transmission and reception circuitry to transmit a command signal after transmitting the clock for the first duration, the first duration corresponding to at least a number of bits in the CRC word.

17. A communication system, comprising:
a first communication device, including:
first transmission and reception circuitry configured to perform a first participation in a communication, the first participation including transmitting and receiving data via a data signal line and transmitting a clock via a clock signal line, and
control circuitry configured to
transmit a command giving an instruction to enter a predetermined data rate mode,
thereafter, detect an occurrence of an error in a signal by comparing a first bit sequence following a preamble of the data received to a second bit sequence corresponding to a data type designated by the preamble, and
in a case where the occurrence of the error is detected, cause the first transmission and reception circuitry to transmit the clock via the clock signal line for a duration corresponding to at least a predetermined number of bits following the preamble; and a second communication device, including:
second transmission and reception circuitry configured to perform a second participation in the communication with the first communication device, the second participation including transmitting and receiving the data via the data signal line and receiving the clock via the clock signal line, wherein the second communication device is configured to transmit the first bit sequence to the first communication device, and wherein when the preamble of the data specifies transmission of a cyclic redundancy check (CRC) word, the CRC word including a token and a CRC-5, and the control circuitry detects an occurrence of at least one of a token error or a CRC error on the basis of the first bit sequence, the transmission and reception circuitry transmits a command signal after transmitting the clock for the first duration, the first duration corresponding to at least a number of bits in the CRC word.

18. The communication system according to claim 17, wherein after transmitting an additional clock for a second duration, the second duration corresponding to a difference between the number of bits in the CRC word and a number of bits in the data.

19. The communication system according to claim 17, wherein the control circuitry is configured to detect that the error has occurred if a number of bits in the second bit sequence is smaller than a number of bits in the first bit sequence.

20. The communication system according to claim 17, wherein the control circuitry is configured to infer that the error has occurred due to the occurrence of a 1-bit error in a first bit of the preamble.

* * * * *